Figure 7:
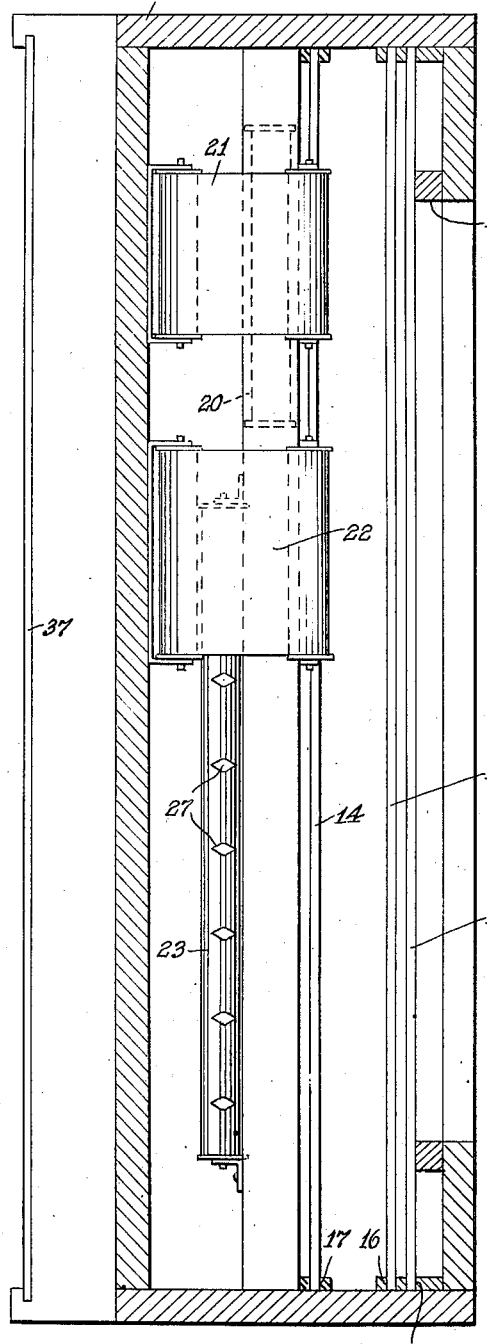

Dec. 14, 1937.   V. McKENNA ET AL   2,102,474
ANIMATED LUMINOUS DISPLAY DEVICE
Filed June 26, 1937   3 Sheets-Sheet 1
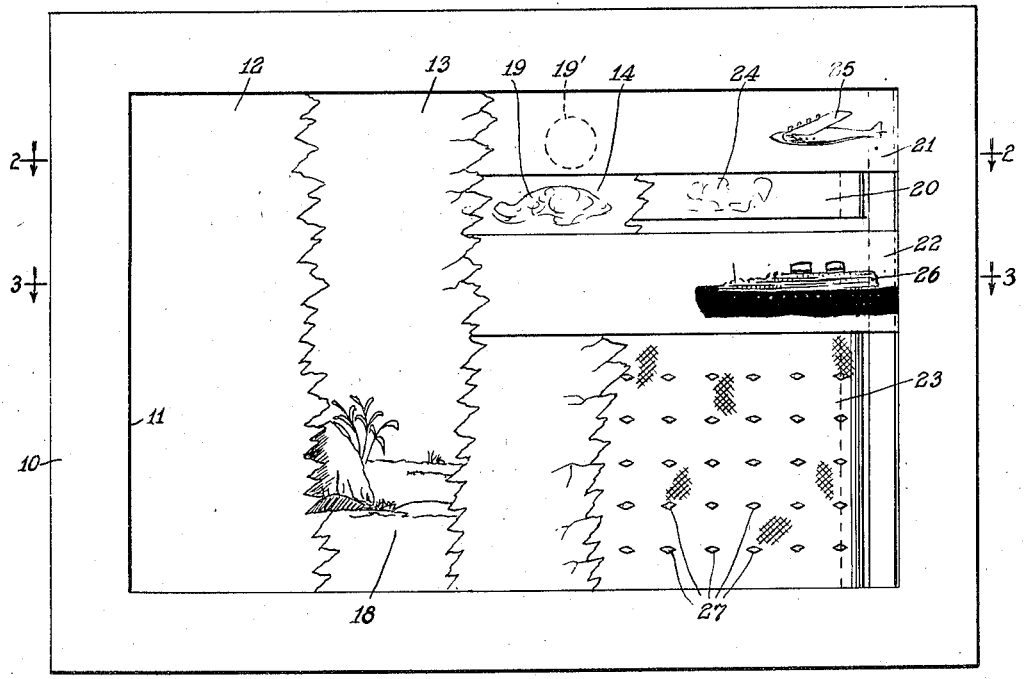
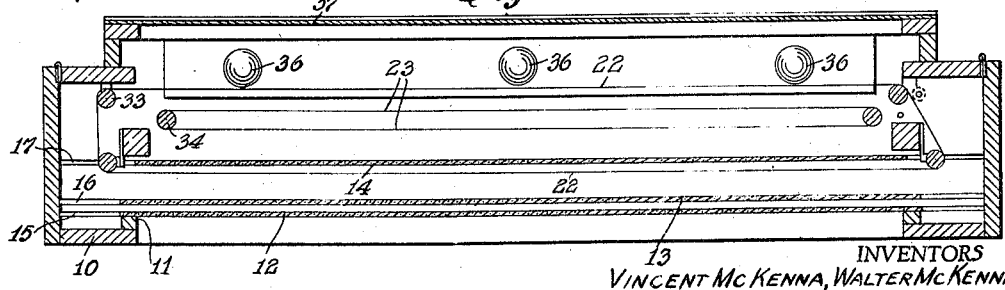
INVENTORS
VINCENT McKENNA, WALTER McKENNA
AND SYDNEY ROUSS
BY
ATTORNEY.

Dec. 14, 1937. V. McKENNA ET AL 2,102,474
ANIMATED LUMINOUS DISPLAY DEVICE
Filed June 26, 1937 3 Sheets-Sheet 2
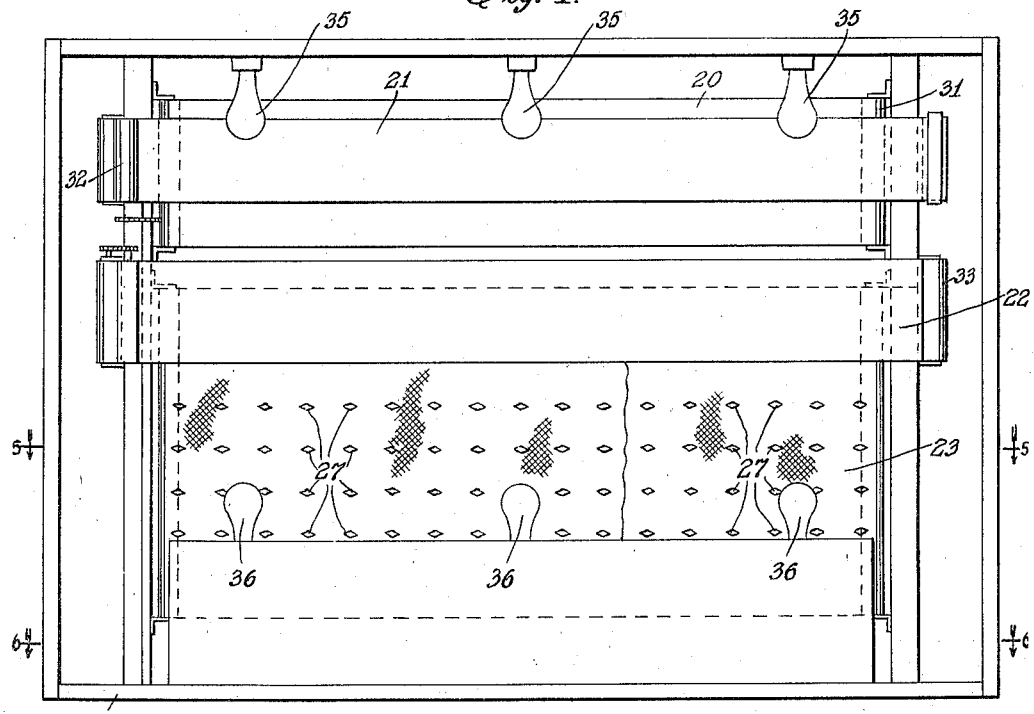
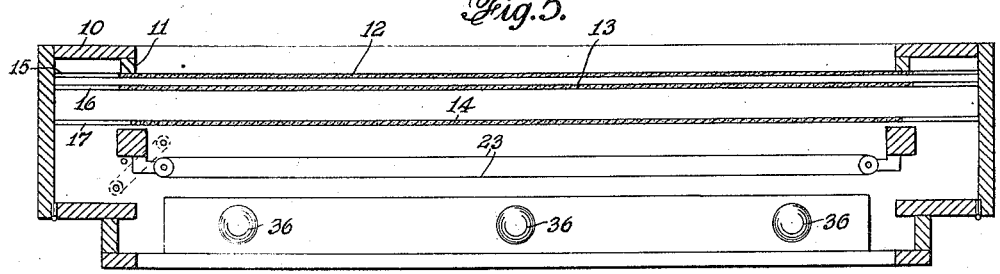
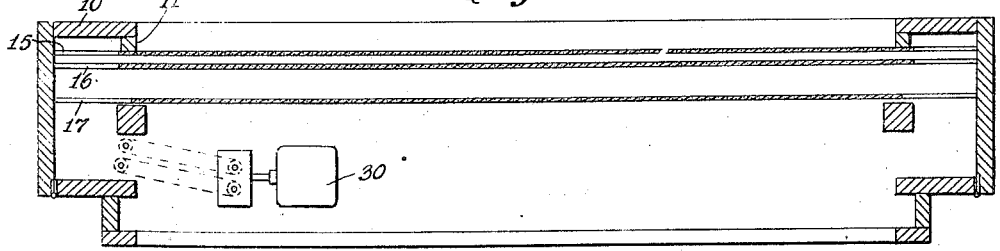
INVENTORS
VINCENT McKENNA, WALTER McKENNA
BY AND SIDNEY ROUSS
ATTORNEY.

Dec. 14, 1937.  V. McKENNA ET AL  2,102,474
ANIMATED LUMINOUS DISPLAY DEVICE
Filed June 26, 1937   3 Sheets-Sheet 3

INVENTORS
VINCENT McKENNA, WALTER McKENNA
AND SYDNEY ROUSS
BY
ATTORNEY.

Patented Dec. 14, 1937

2,102,474

UNITED STATES PATENT OFFICE 2,102,474

ANIMATED LUMINOUS DISPLAY DEVICE

Vincent McKenna, Walter McKenna, and Sydney Rouss, New York, N. Y., assignors to McKenna Glo-Life Corporation, New York, N. Y., a corporation of New York Application June 26, 1937, Serial No. 150,430

9 Claims. (Cl. 40—132)

The invention relates to illuminated display devices such as signs or advertising, or decorative devices of the animated type, and more particularly to devices in which the illumination is effected by the usual incandescent filament lamps or the like.

It has for an object in a sign of this nature to produce new and unusual effects, more especially with respect to the animated feature of the device.

A further object resides in a novel arrangement of a screen and scene-depicting elements whereby an appearance of depth or a three-dimensional effect is attained, as well as a soft tone or natural effect of the ensemble secured.

In carrying out the invention, there is provided a suitable cabinet or housing open at the front, which is closed by means of a screen of translucent material, there being associated with said screen one or more transparencies which are stationary. If desired, the outer or polished surface of the screen may also be provided with suitable matter of a pictorial or advertising nature, which would not in any way interfere with the general effect of the device when illuminated but would enhance its appearance when not illuminated. Associated with these transparencies is a plurality of moving endless bands, one or more of which is of transparent or translucent material carrying further transparencies and another or others of foraminous material of the desired color, the latter band being provided with light apertures spaced generally along the plane of travel of the belt.

For illuminating the device, there is provided one or more sources of illumination within the casing, such as incandescent filament lamps, and located generally behind the said bands. Light rays therefrom will project onto the said screen the matter depicted on the stationary transparencies as well as on the endless bands; and with respect to the band of foraminous material, light rays will pass therethrough and through its apertures as the latter register. The light rays projected through the foraminous material and the apertures will impinge upon the screen and/or stationary transparencies to produce thereon a scintillating or wave effect as the source of light has an apparent movement along the band and varies in intensity in accordance with the degree of overlapping.

Various objects may be depicted on the other and transparent bands to provide an apparent movement thereof with reference to the scences depicted on stationary transparencies, and a wide variety of effects is possible by the novel arrangement.

The nature of the invention, however, will best be understood when described in connection with the accompanying drawings, in which:

Fig. 1 is a front elevation of the novel device with portions of the outer screen and stationary transparencies broken away to disclose the endless movable bands.

Figs. 2 and 3 are horizontal sections therethrough, taken respectively on the lines 2—2 and 3—3, Fig. 1 of the drawings.

Fig. 4 is a rear elevation of the device with the back plate removed and with a portion of one of the endless bands broken away.

Figs. 5 and 6 are horizontal sections, taken respectively on the lines 5—5 and 6—6, Fig. 4.

Figure 8:
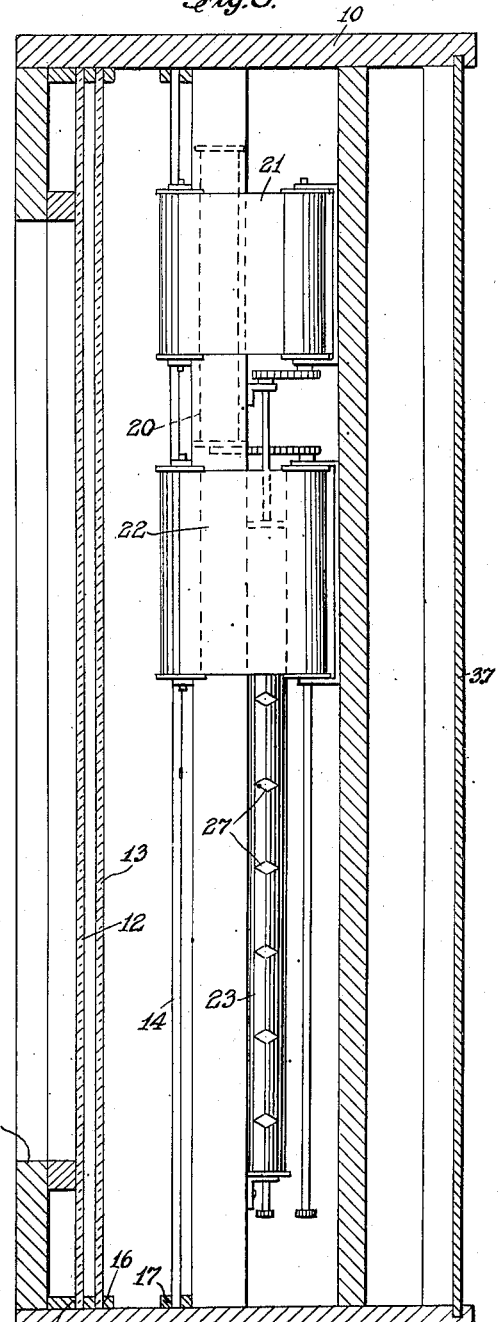

Figs. 7 and 8 are vertical sections through the device, taken respectively on lines 7—7 and 8—8, Fig. 2 of the drawings.

Referring to the drawings, 10 designates a suitable cabinet or housing having preferably a set-back front opening or window 11 to afford a shadow-box effect. This opening is closed by a stationary translucent screen member 12 which may be a ground- or frosted-glass plate and with the polished face exposed. Behind this screen and displaced at various distances therefrom for securing soft or diffused and background effects are located one or more stationary transparencies as the glass plates 13 and 14, which, together with the screen, may be removably fitted in the frame in suitable top and bottom guideways 15, 16, and 17 provided therein, and the former and outermost transparency embodying foreground matter 18 while the other serves for a background provided, for example, with representations 19 of clouds and sun 19'. These transparencies are of transparent material having depicted thereon the desired scene, advertising matter or the like, and may be suitably colored with transparent color, or be more or less opaque if a silhouette effect is desired, light being provided behind the same as hereinafter set forth for showing the matter of the transparencies upon the screen 12. We have found that this matter may conveniently be depicted on a transparency by building up the same upon a skeleton of the object, as from more or less oiled or transparentized paper or cloth cut-outs representing the desired matter and of varying degrees of transparency and in the desired colors.

Also, suitable matter may be attached to the outer polished surface of the screen 12 or upon a further and outer plate (not shown), in which case matter projected onto the screen would not block out this particular portion, as when an image moves past.

The character of the transparencies, and particularly as to their light-transmitting abilities and color as well as the location with respect to the frosted or ground surface of the screen, will determine the general effect and allow of the exercise of considerable artistic ability and ingenuity in simulating reality. Moreover, the appearance of depth and a stereoscopic effect may readily be obtained in this manner; and in accordance with the invention, there are to be associated therewith animated effects, as of movable objects passing across the field of vision, and/or the simulation of wave effects in the case of water scenes.

These animated effects are obtained through the provision of one or more travelling bands, at least one of which is of translucent foraminous material of the desired color or colors and provided with light apertures of sizes and shapes as may be required. Thus, there are located within the housing the endless bands 20, 21, and 22 of transparent material, as celluloid, and a band 23 of foraminous material, the bands 20 and 21 being at the upper portion of the casing and band 20 having, for example, depicted thereon further clouds 24, while on the band 21 there may be depicted aircraft, birds, etc., 25. These bands 20 and 21 are designed to cooperate with the stationary sky scene 19 on the stationary transparency 14, serving to intercept light rays as to the representation 19' of the sun which may thus be obscured and again revealed as the matter on the bands moves past. The band 22 is located vertically intermediate the upper bands and the band 23 of foraminous material and may carry, for example, watercraft, etc. 26 for cooperation with the matter depicted on transparency 13 showing the water scenes 18, with the watercraft appearing to move over the water surface through the action of said band 22. This band as well as the band 21 moves between the two transparencies 13 and 14 to give the proper perspective, while the band 20 moves behind the rearmost transparency 14.

The foraminous band 23 is located at the bottom portion of the casing so as to project its light effects upon the screen 12 through the transparencies 13 and 14 to simulate wave effects in the water scenes depicted on transparency 13— all of the different effects produced by the various bands blending smoothly into one another and no line of demarcation being visible. The action of the band 23 of foraminous material is such that the water effect is possible by direct projection upon screen 12 without any intervention of a water-scene transparency; and the desired color effect is attained through the proper choice of color of the foraminous material which may be ordinary cloth such as mercerized linen and having a moderately open mesh, said cloth being rendered more or less translucent as by applying oil thereto. This will give the base effect of water, while the wave or motion effect is attained through the provision of a plurality of apertures or more or less irregular slits 27 in successive planes of travel so that the same may overlap or register as opposite sections of the band travel past each other in different directions. By this expedient, a very unusual effect is attained in that there is an apparent lateral travel of the light beam, and a variation in intensity thereof, in accordance with the change in overlapping of an aperture of one section with that of the opposite section in the same plane of travel, as well as to some extent with those in displaced planes, so that ocean swells, sea ripples, and glistening effects may be reproduced on the screen.

Suitable mechanism is provided for effecting the travel of the various bands which may all travel in the same direction, or two in opposite directions and either behind or in front of one or more of the fixed transparencies. For example, an electric motor 30 is mounted in the base of the housing and through suitable intermediate mechanism rotates one of a pair of drive rolls or spools 31 and 32 for the bands 20 and 21, similar rolls 33 for the band 22, and rolls 34 for the band 23.

Illumination for the display device is obtained, in the particular embodiment shown, from a series of incandescent lamps 35 at the back and top of the housing, and from a series of lamps 36 at the back and lower portion of the housing, which housing is closed by a back plate 37 behind the lamps.

We claim:

1. An illuminated device, comprising a housing having an opening, a translucent screen closing the same, a stationary transparency located parallel to said screen, an endless belt transparency movable behind said stationary transparency and bearing matter cooperating with matter displayed thereon, a further endless belt provided with light apertures located behind the said stationary transparency and the first-named belt, and a source of light behind all of said transparencies and the apertured belt.

2. An illuminated device, comprising a housing having an opening, a translucent screen closing the same, a pair of stationary transparencies located parallel to said screen, a pair of endless belt transparencies movable one below the other between said stationary transparencies, one belt carrying matter cooperating with matter displayed on one of said stationary transparencies and the other matter displayed on the other of said stationary transparencies, a third endless belt provided with light apertures and located behind both of said stationary transparencies, and a source of light behind all of said stationary and movable transparencies.

3. An illuminated device, comprising a housing having an opening, a translucent screen closing the same, a pair of stationary transparencies located parallel to said screen, a pair of endless belt transparencies movable one below the other between said stationary transparencies, one belt carrying matter cooperating with matter displayed on one of said stationary transparencies and the other matter displayed on the other of said stationary transparencies, a third endless belt provided with light apertures and located behind both of said stationary transparencies and below both the said first- and second-named belt transparencies, and a source of light behind all of said stationary and movable transparencies.

4. An illuminated device, comprising a housing having an opening, a translucent screen closing the same, a pair of stationary transparencies located parallel to said screen, a pair of endless belt transparencies movable one below the other between said stationary transparencies, one belt carrying matter cooperating with matter displayed on one of said stationary transparencies and the other matter displayed on the other of said stationary transparencies, a third endless belt of foraminous material provided with light apertures and located behind both of said stationary transparencies, and a source of light behind all of said stationary and movable transparencies.

5. An illuminated device, comprising a housing having an opening, a translucent screen closing the same, a stationary transparency located parallel to said screen, an endless belt transparency movable in front of said stationary transparency and bearing matter cooperating with matter displayed thereon, and a source of light behind all of said transparencies, together with an additional movable endless belt transparency located behind the stationary and movable transparencies and embodying portions adapted to intercept light from said source normally directed therethrough.

6. An illuminated device, comprising a housing having an opening, a translucent screen closing the same, a pair of stationary transparencies located parallel to said screen, a pair of endless belt transparencies movable one below the other between said stationary transparencies, one belt carrying matter cooperating with matter displayed on one of said stationary transparencies and the other matter displayed on the other of said stationary transparencies, a third endless belt of foraminous material provided with light apertures and located behind both of said stationary transparencies, and a source of light behind all of said stationary and movable transparencies, together with an additional movable endless belt transparency located behind the rearmost of the stationary transparencies and embodying portions adapted to intercept light from said source normally directed therethrough.

7. An illuminated device, comprising a housing having an opening and a translucent screen closing the same, a transparency located behind said screen and bearing display matter, an endless belt transparency movable in the housing parallel to said transparency and bearing display matter, and a source of light within the housing behind said transparencies, rays therefrom passing through said transparencies to project the matter thereof upon said screen, together with an additional movable endless belt transparency located behind the said transparencies and the display matter thereof and embodying portions adapted to intercept light from said source normally directed therethrough.

8. An illuminated device, comprising a housing having an opening and a translucent screen closing the same, a transparency located behind said screen and bearing display matter, a travelling band of foraminous material provided with light apertures and located behind the screen, together with means to drive the same, and a source of light within the housing behind said transparency and band, rays therefrom passing through the band and its apertures onto the screen to cooperate with the matter of said transparency projected upon said screen by further rays of said light.

9. An illuminated device, comprising a housing having an opening and a translucent screen closing the same, a transparency bearing display matter, located behind the screen in said housing and displaced therefrom, a pair of light-transmitting and translucent bands within the housing, together with means to move the same in different fields behind the screen, and the one being in the nature of a transparency movable in front of the said transparency and bearing matter cooperating with the matter displayed thereon, and the other of foraminous material provided with light apertures, and a source of light within the housing, rays therefrom projecting matter of the one band and associated transparency onto said screen and further rays passing through the other band and its apertures onto the screen to cooperate with the matter of said transparencies projected upon said screen.

VINCENT McKENNA.
WALTER McKENNA.
SYDNEY ROUSS.